(12) United States Patent
Strickland

(10) Patent No.: US 10,455,882 B2
(45) Date of Patent: Oct. 29, 2019

(54) METHOD AND SYSTEM FOR PROVIDING REAR COLLISION WARNING WITHIN A HELMET

(71) Applicant: Honda Motor Co., Ltd., Tokyo (JP)

(72) Inventor: Richard Dean Strickland, Mooresville, NC (US)

(73) Assignee: Honda Motor Co., Ltd., Tokyo (JP)

( * ) Notice: Subject to any disclaimer, the term of this patent is extended or adjusted under 35 U.S.C. 154(b) by 207 days.

(21) Appl. No.: 15/719,991

(22) Filed: Sep. 29, 2017

(65) Prior Publication Data

US 2019/0098953 A1    Apr. 4, 2019

(51) Int. Cl.
| G06K 9/00 | (2006.01) |
| A42B 3/04 | (2006.01) |
| G08G 1/16 | (2006.01) |
| H04N 5/232 | (2006.01) |

(52) U.S. Cl.
CPC ............ *A42B 3/0426* (2013.01); *A42B 3/046* (2013.01); *G06K 9/00805* (2013.01); *G08G 1/166* (2013.01); *H04N 5/23296* (2013.01)

(58) Field of Classification Search
CPC .. A42B 3/0426; A42B 3/046; G06K 9/00805; G08G 1/166; H04N 5/23296
See application file for complete search history.

(56) References Cited

U.S. PATENT DOCUMENTS

| 9,414,634 | B2 | 8/2016 | Gindin | |
| 9,445,639 | B1 | 9/2016 | Aloumanis et al. | |
| 10,021,932 | B2* | 7/2018 | Shearman | A42B 3/0426 |
| 10,382,879 | B1* | 8/2019 | Akama | H04S 7/303 |
| 2011/0234799 | A1* | 9/2011 | Mueller | B60R 1/00 348/148 |
| 2013/0305437 | A1 | 11/2013 | Weller et al. | |
| 2013/0311075 | A1* | 11/2013 | Tran | B60W 30/09 701/117 |
| 2015/0228066 | A1 | 8/2015 | Farb | |
| 2015/0320135 | A1* | 11/2015 | Lowe | A42B 3/222 2/411 |
| 2015/0329045 | A1 | 11/2015 | Harris | |
| 2016/0066640 | A1* | 3/2016 | Weller | A42B 3/0406 345/8 |
| 2016/0110615 | A1 | 4/2016 | Weller et al. | |

(Continued)

FOREIGN PATENT DOCUMENTS

PL    2763410    11/2016

*Primary Examiner* — Gregory M Desire
(74) *Attorney, Agent, or Firm* — Rankin, Hill & Clark LLP

(57) ABSTRACT

A method for providing a collision warning using an image capture device mounted on a rear portion of a helmet, including receiving a series of image frames and receiving spatial position data about the helmet from an inertial measurement unit. The spatial position data includes at least one of a roll angle, a yaw angle, and a pitch angle of the helmet. The method includes adjusting an orientation of the series of image frames based on the spatial position data. Thus, the orientation of the series of image frames is level with an orientation of the scene. The method includes identifying a target vehicle and calculating a speed of the target vehicle based on a rate of change of a position of the target vehicle. Further, the method includes controlling an output device and/or the motorcycle based on the speed of the target vehicle and the rate of change.

17 Claims, 11 Drawing Sheets

(56) References Cited

U.S. PATENT DOCUMENTS

| | | |
|---|---|---|
| 2016/0309827 A1 | 10/2016 | Ambrose |
| 2016/0355126 A1 | 12/2016 | Anderson et al. |
| 2017/0131762 A1 | 5/2017 | Liang |
| 2017/0151994 A1* | 6/2017 | Braunberger ............ B62J 99/00 |
| 2017/0367425 A1* | 12/2017 | Chen ...................... A42B 3/046 |
| 2018/0007994 A1* | 1/2018 | Boesen ................... A42B 3/30 |
| 2019/0098953 A1* | 4/2019 | Strickland ............ A42B 3/0426 |

* cited by examiner

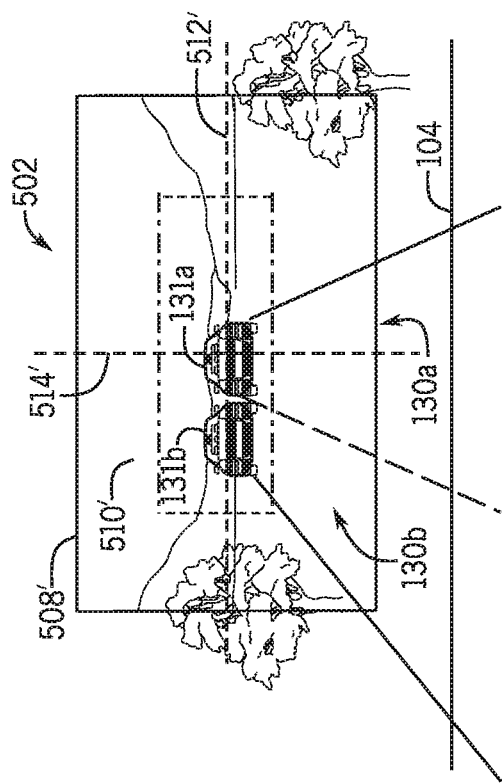
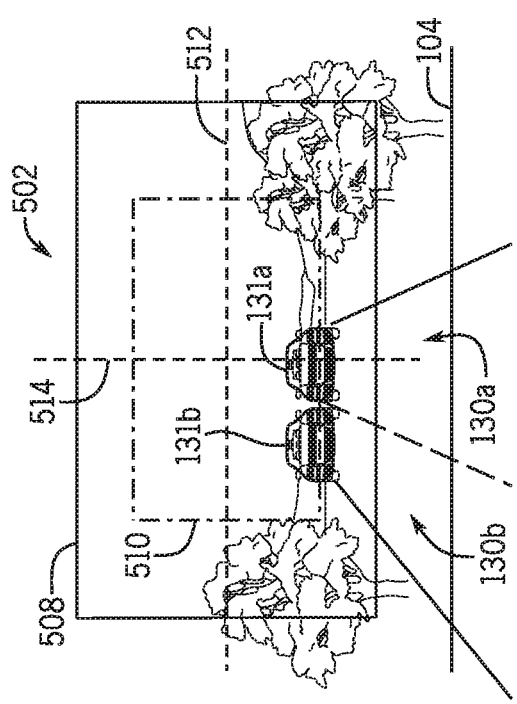

METHOD AND SYSTEM FOR PROVIDING REAR COLLISION WARNING WITHIN A HELMET

BACKGROUND

A vehicle approaching or following closely to the rear of a motorcycle can be hazardous to the motorcycle operator. Accordingly, it is desirable for the motorcycle and/or the motorcycle operator to detect objects approaching the motorcycle from directly behind the motorcycle. However, many motorcycle operators experience difficulty in detecting obstacles behind them in a rear blind spot. Side mirrors can help detect obstacles in blind spots, but there remains difficulty in restricted sight and skewed camera data for objects directly behind the motorcycle (e.g., in the same lane as the motorcycle, but behind the motorcycle). More specifically, due to the nature of a helmet and the tilting maneuvers of the motorcycle operator, the motorcycle operator has a very limited view directly behind the motorcycle. Vehicle cameras can also help detect obstacles in blind spots, however, the dynamic nature of the motorcycle and the motorcycle operator (e.g., tilting, torso and body movement) as mentioned above can skew rear view camera data. Accordingly, it is desirable for the motorcycle and/or the motorcycle operator to detect objects directly behind the motorcycle regardless of the posture of the motorcycle and/or the motorcycle operator.

BRIEF DESCRIPTION

According to one aspect, a computer-implemented method for providing a collision warning includes an image capture device mounted on a rear portion of a helmet, the method comprising and receiving a series of image frames from the image capture device. Further, the method includes receiving spatial position data about the helmet from an inertial measurement unit integrated with the helmet. The spatial position data includes at least one of a roll angle, a yaw angle, and a pitch angle of the helmet. The method includes adjusting an orientation of the series of image frames based on the spatial position data so that the orientation of the series of image frames is level with an orientation of the scene. The method also includes identifying a target vehicle in the series of image frames and calculating a speed of the target vehicle based on a rate of change of a position of the target vehicle in the series of image frames. Further, the method includes controlling an output device coupled to the helmet to generate the collision warning based on the speed of the target vehicle and the rate of change of the position of the target vehicle.

According to another aspect, a helmet for a motorcycle being ridden by a driver wearing the helmet includes an image capture device mounted to a rear portion of the helmet. The image capture device faces toward a rear direction of the helmet. The helmet also includes an inertial measurement unit, an output device, and a processor operably connected for computer communication to the image capture device, the inertial measurement unit, and the output device. The processor receives spatial position data about the helmet relative to a reference orientation from the inertial measurement unit. The spatial position data includes at least one of a roll angle, a yaw angle, and a pitch angle of the helmet. Further, the processor adjusts an orientation of the series of image frames based on the spatial position data so that the orientation of the series of image frames is level with the reference orientation. The processor identifies a target vehicle in the series of image frames, calculates a rate of change of the target vehicle in the series of image frames, and upon determining the target vehicle is approaching the motorcycle, controlling the output device to generate a warning.

According to a further aspect, a non-transitory computer-readable storage medium including instructions that when executed by a processor, causes the processor to receive a series of image frames from an image capture device mounted to a rear portion of a helmet. The series of images capture a scene in a rearward direction. The processor receives spatial position data about the helmet from an inertial measurement unit integrated with the helmet. The spatial position data includes at least one of a roll angle, a yaw angle, and a pitch angle of the helmet. The processor adjusts an orientation of the series of image frames based on the spatial position data so that the orientation of the series of image frames is level with an orientation of the scene. The processor detects a target vehicle in the series of image frames and calculates a speed of the target vehicle based on a rate of change of a position of the target vehicle in the series of image frames. The processor generates a control signal to control an output device coupled to the helmet to output a warning based on the speed of the target vehicle and the rate of change of the position of the target vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 5B is an image frame of a scene as viewed through the image capture device on the helmet pitched in a downward direction as shown in FIG. 5A according to an exemplary embodiment;

FIG. 5C is the image frame of FIG. 5B adjusted to compensate for the position of the image capture and the helmet according to an exemplary embodiment;

DETAILED DESCRIPTION

Figure 1A:
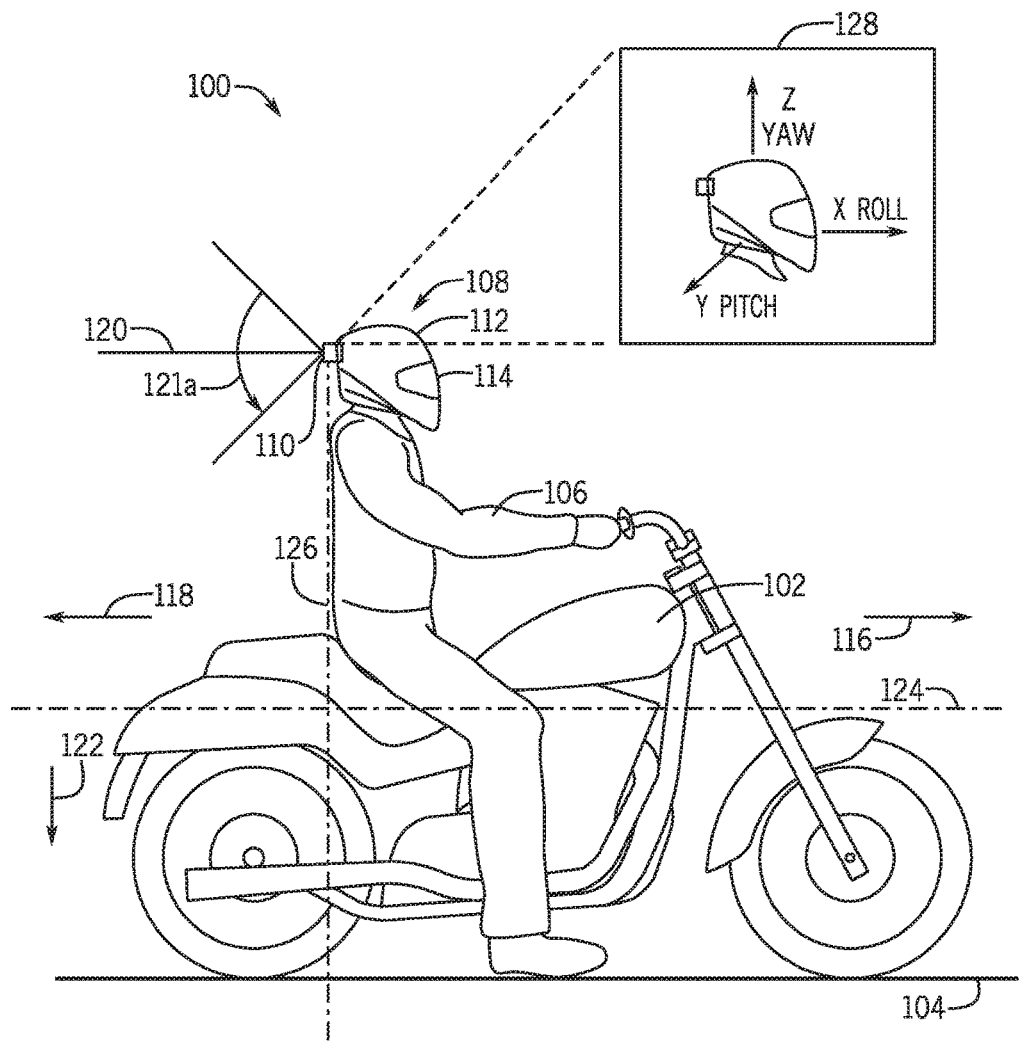
FIG. 1A is side elevation view of a motorcycle providing a collision warning according to an exemplary embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Figure 1B:
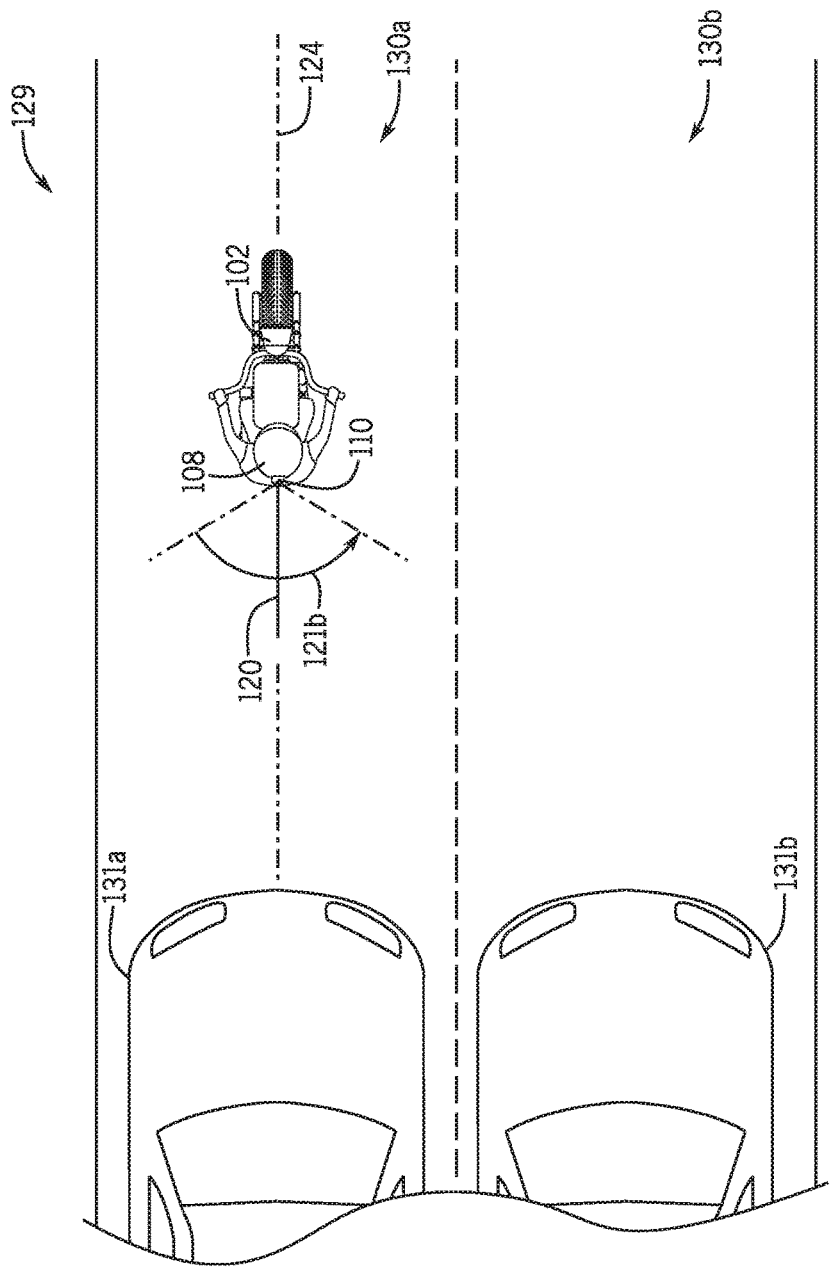
FIG. 1B is top elevation view of the motorcycle of FIG. 1A providing a collision warning according to an exemplary embodiment.

Generally, the systems and methods discussed herein are directed to a rear collision warning system including an image capture device mounted to the rear of a helmet. The rear collision warning system includes image processing techniques to compensate for the position of the image capture device and the helmet as well as for determining whether an object (e.g., a vehicle) is approaching the rear of the motorcycle, determining whether the object poses a threat to the motorcycle, and providing warnings and/or controlling systems accordingly. Referring now to the drawings, FIG. 1A is a side elevation view 100 including a motorcycle 102 for providing a collision warning according to one exemplary embodiment. FIG. 1A will be discussed in conjunction with FIG. 1B, which is a top elevation view 129 of the motorcycle 102 of FIG. 1A. In FIG. 1A, the motorcycle 102 is shown on a road having a ground plane 104 and the motorcycle 102 is being ridden by a motorcycle operator 106. Although not shown, the ground plane 104 is a two-dimensional plane. In FIG. 1B, the road having the ground plane 104 includes a lane 130a and a lane 130b. The motorcycle 102 is travelling in the lane 130a.

Referring again to FIG. 1A, the motorcycle operator 106 is wearing a helmet 108 and an image capture device 110 is mounted on the helmet 108. The helmet 108 includes a shell 112 that defines an interior volume of the helmet 108, and a visor 114 proximal an anterior end of the shell 112. In some embodiments, the visor 114 is a retractable face shield and/or a heads-up display (HUD). The motorcycle operator 106 has f forward field of view (not shown) projecting through the visor 114 and directed along a forward travelling direction (e.g., direction of motion) shown by arrow 116. It is understood that the system and methods discussed herein can also be implemented with other types of moving vehicles that are capable of carrying one or more occupants and can be powered by any form of energy. For example, a vehicle carrying a driver, a bicycle carrying a cyclist, among others. Further, it is understood that the helmet 108 can include any type of head mounted device and/or portable device (e.g., a portable device 109 shown in FIG. 1C), that can be placed on a user's body (e.g., head, torso, shoulder, back, arm), for example, goggles, glasses, hat, an eye piece, an ear piece, clothing, jewelry, among others.

The image capture device 110 is mounted to a rear portion of the helmet 108. More specifically, the image capture device 110 is mounted to a posterior end of the shell 112 positioned at a viewing height 126, which is a line aligned with a direction of gravity 122. In other embodiments, which are discussed herein, an image capture device 158, which can include the same and/or similar components and functions of the image capture device 110, can be mounted to a rear portion of the motorcycle 102.

With respect to the image capture device 110 mounted to a rear portion of the helmet 108, the image capture device 110 defines an optical axis 120 having a field of view opposite the visor 114. The field of view is directed in a rearward facing direction of the motorcycle 102 as shown by arrow 118, which is opposite the forward travelling direction of the motorcycle 102 shown by arrow 116. The field of view of the image capture device 110 can include a vertical field of view (VFOV) 121a shown in FIG. 1A, and a horizontal field of view (HFOV) 121b shown in FIG. 1B. Based on the above, the image capture device 110 has a field of view exterior of and rearward of the motorcycle 102. Accordingly, since the image capture device 110 is mounted to a rear portion of the helmet 108 and is rearward facing, the image capture device 110 captures images and/or video of a scene (e.g., environment surrounding the motorcycle 102) directly behind the motorcycle 102, in a rearward field of view opposite the travelling direction 116 of the motorcycle 102.

Imaging devices, such as the image capture device 110, are subject to dynamic variations in field of view range, position, direction, and angle because of the dynamic nature of motorcycle 102 movement and body movement of the motorcycle operator 106. In particular, images and/or video captured by the image capture device 110 can include some degree of tilt, rotation or translation because of the movement of the motorcycle 102, the motorcycle operator 106, and the head of the motorcycle operator 106. Movement of the head of the motorcycle operator 106 translates to movement of the helmet 108, which consequently translates to movement of the image capture device 110, the optical axis 120 and the field of view.

In FIGS. 1A and 1B, the helmet 108 is in a preferred orientation according to a preferred helmet axis 128 so that the optical axis 120 of the image capture device 110 has an orientation that is level with a level orientation of a scene captured in the image and/or video. Thus, according to the preferred helmet axis 128, the helmet 108 has a normal straight ahead pose where the motorcycle operator 106 has a straight view line projecting through the visor 114 directed along a forward travelling direction (e.g., direction of motion) shown by arrow 116. The preferred helmet axis 128 is relative to a reference orientation and includes an x-axis (roll), y-axis (pitch), and z-axis (yaw). The helmet axis 128 shown in FIG. 1A is a preferred axis because the helmet 108 is level with the ground plane 104 (level with an orientation of the scene). More specifically, the x-axis is parallel to the ground plane 104, the z-axis is parallel to a longitudinal axis 124 of the motorcycle 102, and the y-axis is aligned with the direction of gravity 122. As mentioned above, the orientation of the helmet 108 as shown in FIGS. 1A and 1B is aligned with the preferred axis 128. The reference orientation is with respect to the ground plane 104 and the direction of gravity 122, which is perpendicular to the ground plane 104 (e.g., road) and perpendicular to a longitudinal axis 124 of the motorcycle 102. As will be discussed herein, the reference orientation is a level orientation of the scene captured in the image and/or video.

As mentioned above, while operating the motorcycle 102, the head of the motorcycle operator 106 can move thereby translating to movement of the helmet 108 and/or the image capture device 110 about the helmet axis 128 relative to the reference orientation. For example, the motorcycle operator 106 can directly rotate (roll) his head to the left or the right along the x-axis, turn his head to the left or right along the z-axis, and/or tilt (move up/down, pitch) his head along the y-axis. The direct movement of the head of the motorcycle operator 106 translates to movement of the helmet 108. In addition, movement, actions, postures and gestures of other body parts of the motorcycle operator 106 can affect the orientation and position of the head and thus the orientation of the helmet 108. For example, the posture of the motorcycle operator 106 (see FIG. 5A) can affect the orientation and position of the head and thus the orientation of the helmet 108.

Figure 2A:
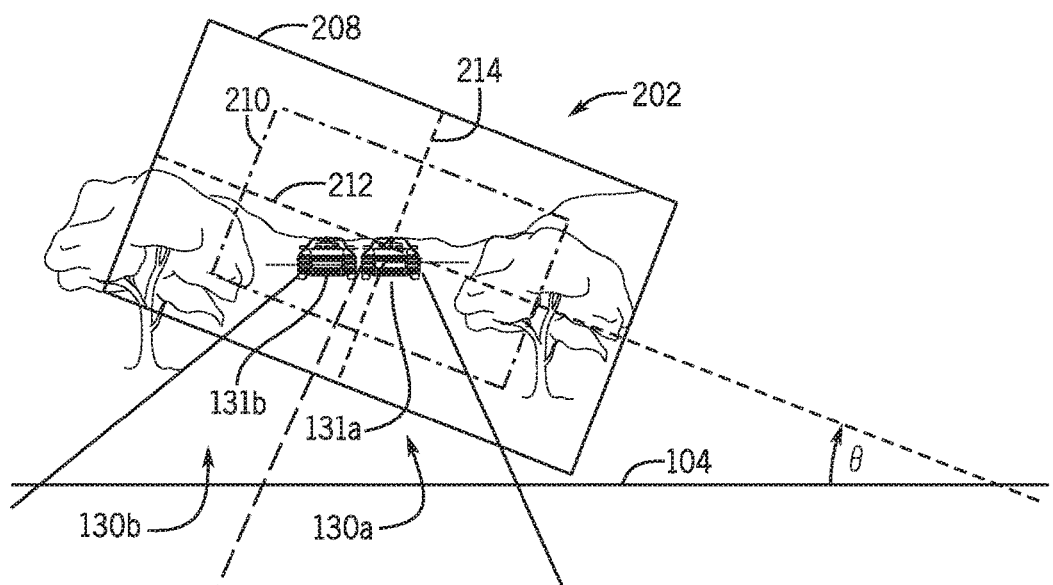
FIG. 2A is an image frame of a scene as viewed through an image capture device when the helmet is rolled according to an exemplary embodiment.

As mentioned above, these movements of the helmet 108 also affect the orientation of image capture device 110, by shifting the optical axis 120 and the field of view of the image capture device 110. As an illustrative example, FIG. 2A represents a scene 202 including the surrounding environment of the motorcycle 102 in a rearward direction as shown in FIGS. 1A and 1B. Specifically, the scene 202 shows the target vehicle 131*a* (e.g., a target object) behind the motorcycle 102 in the same lane as the motorcycle 102, namely, the lane 130*a*, and the second target vehicle 131*b* in the lane 130*b*. The scene 202 has a level orientation as referenced by the ground plane 104. Said differently, the target vehicle 131*a* and the second target vehicle 131*b* are positioned on a level ground and/or road (i.e., the ground plane 104).

In FIG. 2A, the image capture device 110 captures an image frame 208 and an image capture area 210 when the helmet 108 is tilted (i.e., rolled). For example, if the image capture device 110 takes an image of the scene 202 and the helmet 108 is tilted by Θ degrees, the image will also be tilted by Θ degrees. Thus, as shown in FIG. 2A, the image frame 208 and the image capture area 210 are tilted by Θ degrees. The image frame 208 has a 2D image plane including a horizontal image plane 212 (e.g., an image horizon) and a vertical image plane 214. In FIG. 2A, the image plane is offset from the ground plane 104 and the direction of gravity 122. Said differently, the horizontal image plane 212 and the vertical image plane 214 are not level with the orientation of the scene 202.

Figure 2B:
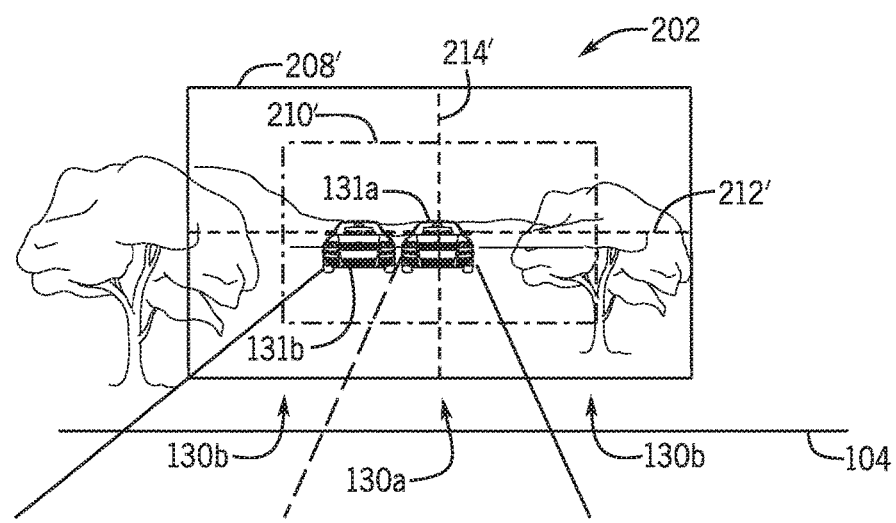
FIG. 2B is the image frame of FIG. 2A adjusted to compensate for the rolled position of the image capture device and the helmet according to an exemplary embodiment.

The systems and methods discussed herein adjust images and/or video to compensate for the dynamic movements of the motorcycle 102 and the motorcycle operator 106 thereby creating images and/or video with proper alignment without requiring physical adjustment of the image capture device 110 and/or the helmet 108. In particular, the orientation of the captured image (i.e., image frame) is adjusted (e.g., rotated, translated) and the captured image is cropped (i.e., image capture area) to a particular area for a field of view. For example, the orientation adjustment of the image frame 208 and the image capture area 210 are shown in FIG. 2B. Here, the image frame 208' and the image capture area 210' have been rotated (e.g., by angle Θ) to an orientation that is level with a level orientation of the scene 202 (i.e., the ground plane 104 and the direction of gravity 122). Said differently, the image frame 208 is rotated an angular distance equal to the amount of degrees of tilt of the image capture device 110 thereby resulting in the image frame 208'. As will be discussed herein, proper orientation and image processing, allows for more accurate identification of approaching vehicles in a reward direction of the motorcycle 102.

Figure 1C:
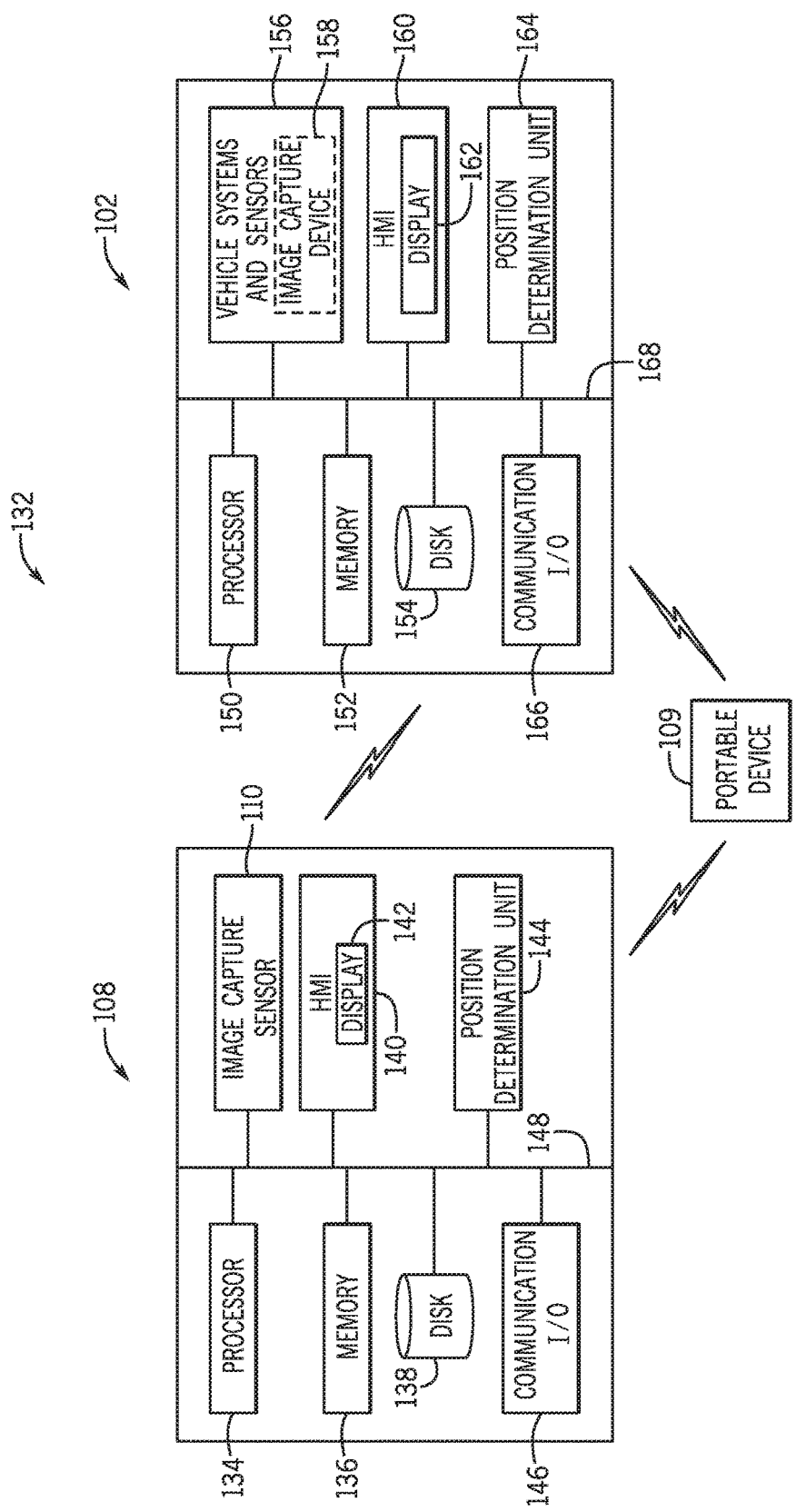
FIG. 1C is a schematic block diagram of the motorcycle and the helmet of FIGS. 1A and 1B according to an exemplary embodiment.

The collision warning system described herein including the motorcycle 102 and the helmet 108 will now be described in more detail with FIG. 1C. FIG. 1C is an exemplary operating environment and system 132 for implementing a collision warning system according to one embodiment and includes a block diagram of the motorcycle 102, the helmet 108, and a portable device 109, which are each operably connected for computer communication, for example, as part of a vehicle communication network (not shown). It is understood that the components shown in FIGS. 1A, 1B, and 1C as well as the components of other systems, hardware architectures, and software architectures discussed herein, can be combined, omitted, or organized into different architectures for various embodiments.

In FIG. 1C, the helmet 108 includes a processor 134, a memory 136, a disk 138, the image capture device 110, a human machine interface (HMI) 140 including a display 142, a position determination unit 144, and a communication interface 146, which are each operably connected for computer communication via a bus 148 and/or other wired and wireless technologies. It is understood that although not shown in FIG. 1C, one or more of the components of the helmet 108, can also be implemented with the motorcycle 102 and/or the portable device 109, and vice versa. Further, it is understood that the helmet 108, the motorcycle 102, and the portable device 109 can include other computer components, hardware, and architectures not shown.

Referring again to the helmet 108 shown in FIG. 1C, the processor 134 can include logic circuitry with hardware, firmware, and software architecture frameworks for facilitating image processing and collision warning. Thus, in some embodiments, the processor 134 can store application frameworks, kernels, libraries, drivers, application program interfaces, among others, to execute and control hardware and functions discussed herein. In some embodiments, the memory 136 and/or the data store (e.g., disk) 138 can store similar component as the processor 134 for execution by the processor 134.

The image capture device 110 can be any type of image capture device and/or sensor, for example, a charge-coupled device sensor (CCD sensor), a complementary metal—oxide—semiconductor (CMOS), or a hybrid semiconductor imaging technology. The image capture device 110 can be high definition capable of high definition imaging or video capture with a wide-angle capture. The image capture device 110 can include various calibration and processing functions to capture an image or a video and output a desired image. As mentioned above, the image capture device 110 is positioned on a rear portion of the helmet 108 and is directed in a rearward direction to capture a surrounding (e.g., scene) environment behind the motorcycle 102. Thus, the image capture device 110 serves to capture an image or video (e.g., a series of image frames, a plurality of image frames) of the scene behind the motorcycle 102, and facilitate the processing (e.g., adjustment, correction of orientation) and output of image frames having an orientation level with an orientation of the scene based on the spatial position data (discussed below) of the helmet 108. The series of image frames can be stored (e.g., memory 136, disk 138) transmitted and/or displayed. In the embodiments discussed herein, the adjusted series of image frames are analyzed to identify target vehicles and provide collision warnings to, for example, the HMI 140, the HMI 160, and/or the portable device 109.

The HMI 140 can be used to receive input from the motorcycle operator 106 and/or provide feedback to the motorcycle operator. Thus, the HMI 140 can include a display portion and/or an input portion. For example, the HMI 140 can include the display 142 (e.g., an output device). The display 142 could also be a heads-up display (HUD) in the helmet 108, for example, projected in the interior (e.g., on the visor 114) of the helmet 108. The HMI 140 can receive inputs that allow the motorcycle operator 106 to interact or provide input with gestures, clicks, selections, voice commands. This can be provided with a touch screen, a touch pad, a track pad, hard buttons, soft buttons, microphone, among others. As mentioned above, the HMI 140, and particularly the display 142, can display information (e.g., graphics, warnings, and notifications). For example, the processor 134 can generate information, suggestions, warnings, and/or alerts and provide the same the motorcycle operator 106 on the display 142. In particular, the display 142 can provide collision warning information and alerts. The information, warnings, etc., can include, but are not limited to, one or more navigation maps, symbols, icons, graphics, colors, images, photographs, videos, text, audible information, among others. The HMI 140 can also include other systems that provide visual, audible (e.g., speakers), and/or tactile/haptic feedback to the motorcycle operator 106.

The position determination unit 144 can include hardware (e.g., sensors) and software to determine a position and/or orientation of the helmet 108. More specifically, the position determination unit 144 determines spatial position data about the helmet 108 The spatial position data includes at least one of a roll angle, a yaw angle, and a pitch angle of the helmet 108. In one embodiment, the position determination unit 144 includes an inertial measurement unit (IMU). The IMU can include a gyroscope, accelerometer, magnetometers, among others. In other embodiments, the position determination unit 144 can include a global positioning system (GPS) and/or a navigation system that provides navigation maps and navigation information.

The communication interface 146 can include software and hardware to facilitate data input and output between the components of the helmet 108 and other components of the vehicle communication network (not shown), for example, the motorcycle 102. Specifically, the communication interface 146 can include network interface controllers (not shown) and other hardware and software that manages and/or monitors connections and controls bi-directional data transfer between the communication interface 146 and other components via the bus 148 and/or other wired and wireless technologies. For example, the helmet 108 configured with the communication interface 146 can communicate over networks (not shown) with the motorcycle 102 and/or the portable device 109, other servers and/or entities operable for computer communication over the network, other vehicles, and infrastructures via one or more wireless communication protocols including, but not limited to, cellular communication, ZigBee, Bluetooth, WiFi, dedicated short range communication (DSRC), and/or any other suitable common or proprietary wireless protocol. In one embodiment, the helmet 108 can exchange data, including the spatial position data, with the motorcycle 102.

As shown in FIG. 1C, in some embodiments, the motorcycle 102 can include a processor 150, a memory 152, a disk 154, vehicle systems and sensors 156, an image capture device 158, an human machine interface (HMI) 160 including a display 162, a position determination unit 164, and a communication interface 166, which are each operably connected for computer communication via a bus 168 and/or other wired and wireless technologies. For purposes of simplicity, like named components of the motorcycle 102 can include the same or similar features and functions as described above with the helmet 108, and are not discussed in detail herein.

In some embodiments, the vehicle systems and sensors 156 include systems and sensors that provide advanced driver assistance and/or collision mitigation. For example, a collision warning system, a collision mitigation braking system, a blind spot indicator system, a lane keep assist system, among others. As will be discussed herein, in some embodiments, these systems can be controlled based on the spatial position data and detection of a possible collision with a target vehicle approaching the rear of the motorcycle 102.

The vehicle systems and sensors 156 can include various vehicle sensors that sense and/or measure data internally and/or externally from the motorcycle 102. More specifically, vehicle systems and sensors 156 can include vehicle sensors for sensing and measuring a stimulus (e.g., a signal, a property, a measurement, a quantity) associated with the motorcycle 102 and/or a particular vehicle system of the motorcycle 102. In some embodiments, the vehicle sensors are for sensing and measuring a stimulus associated with a vehicle and/or an object in proximity to the motorcycle 102, for example, a target vehicle detected behind the motorcycle 102. For example, the vehicle systems and sensors 156 can include RADAR and/or LIDAR sensors that measure distance (e.g., lateral, longitudinal) and speed of objects surrounding the motorcycle 102.

The vehicle systems and sensors 156 can optionally include an image capture device 158 that can provide the same and/or similar hardware and functions of the image capture device 110. In one embodiment, the image capture device 158 can be mounted to a rear portion of the motorcycle 102 (not shown), for example on a rear fender and/or near a rear taillight of the motorcycle 102. Thus, in some embodiments, the image capture device 158 can capture images and/or video similar to the image capture device 110, namely, in a field of view directed in a rearward facing direction of the motorcycle 102 as shown by arrow 118, which is opposite the forward travelling direction of the motorcycle 102 shown by arrow 116. The image capture device 158 can capture the images and/or video in lieu of the image capture device 110 and/or in combination with the image capture device 110. For example, the image capture device 158 could capture images and/or video simultaneously and/or in parallel with the image capture device 110. Thus, it is understood that the system and methods discussed herein with respect to the image capture device 110 and the images and/or video captured by the image capture device 110, can be implemented with the image capture device 158 and the images and/or video captured by the image capture device 158.

Similar to the helmet 108, the motorcycle 102 can also include the HMI 160 and the display 162, with the similar and/or same functions as discussed above with the HMI 140 and the display 142. The display 162 can be integrated with a windshield (not shown) of the motorcycle 102, for example, as a heads-up display. The display 162 can also be integrated with a display panel and/or an instrument cluster. In some embodiments, the HMI 160 can include other systems and components of the motorcycle 102 that provide visual, audible, and/or tactile/haptic feedback to the motorcycle operator 106.

FIG. 1C also include a portable device 109, which in some embodiments, can be a handheld device and/or a wearable device associated with the motorcycle 102 and/or the motorcycle operator 106. In some embodiments, which will be discussed herein, the portable device 109 can provide collision warnings including visual, audible, and/or tactile/haptic feedback to the motorcycle operator 106. Although not shown in FIG. 1C, the portable device 109 can include one or more of the computer components, functions, and/or processes discussed with the motorcycle 102 and/or the helmet 108. For example, although not shown, the portable device 109 can include a processor, an image capture device, an HMI, a display, among other like components similar to the motorcycle 102 and/or the helmet 108.

Figure 3:
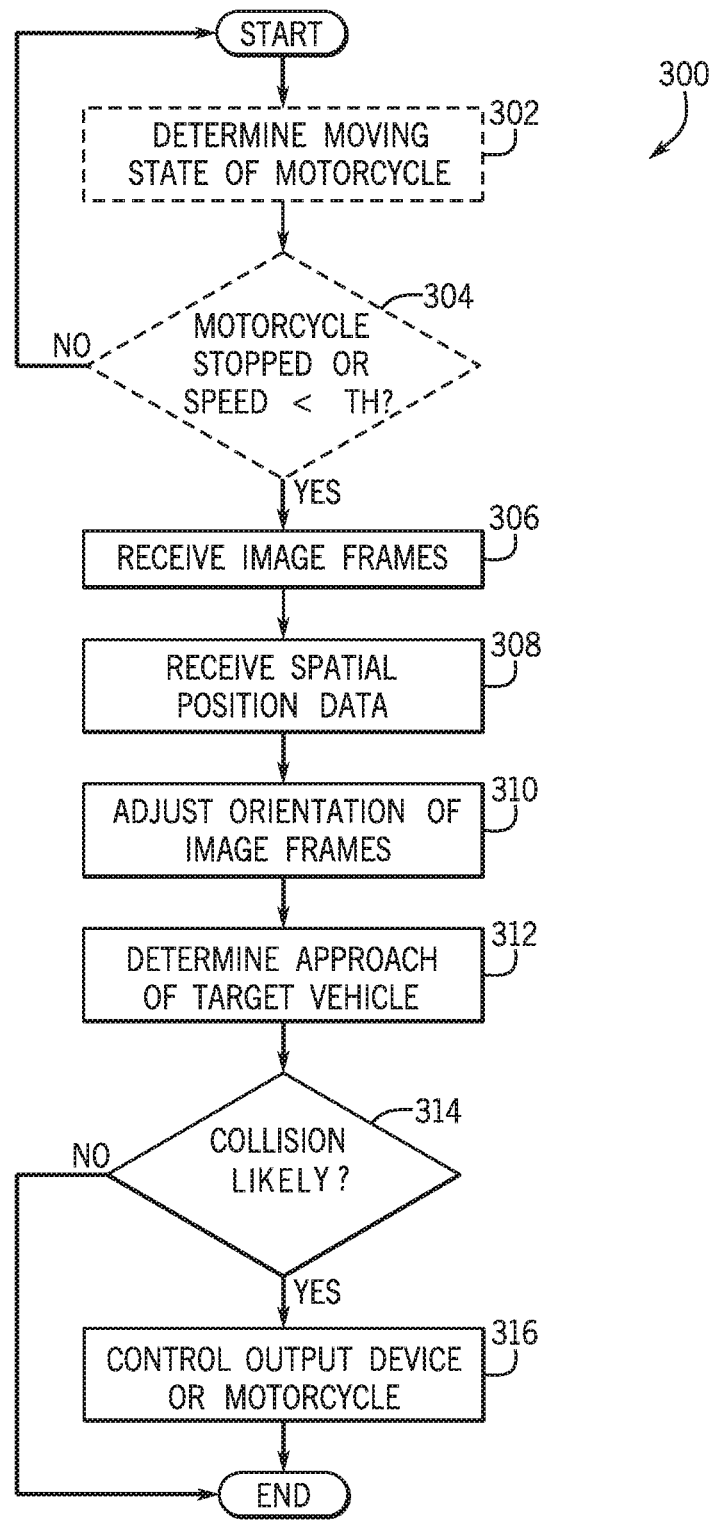
FIG. 3 is a process flow diagram of a method for providing a collision warning according to an exemplary embodiment.

The above systems and components will now be described with reference to FIG. 3, which illustrates a method 300 for providing a collision warning using the image capture device 110 mounted on a rear portion of the helmet 108 according to an exemplary embodiment. Thus, FIG. 3 will be described with reference to the components of FIGS. 1A, 1B, 1C, 2A, and 2B. At block 302, the method 300 optionally includes determining a moving state of the motorcycle 102. For example, a stopped state (e.g., stationary state) or a moving state of the motorcycle 102. In one embodiment, the processor 134 determines the moving state of the motorcycle 102 based data from the position determination unit 144. The moving state can indicate the motorcycle 102 is stationary (e.g., in a stopped state), is slowing down (e.g., a slowdown state), and/or the motorcycle 102 is travelling at a particular speed, for example, at a speed less than a predetermined speed threshold. In one embodiment, the processor 134 determines the moving state of the motorcycle 102 based on an acceleration detected by the position determination unit 144 (e.g., an acceleration sensor). In other embodiments, the processor 134 can acquire data to determine the moving state from the vehicle systems and sensors 156, the position determination unit 164, and/or the portable device 109.

Accordingly, at block 304, the method 300 optionally includes determining if the motorcycle is in a stopped state, a slowdown state, or the speed of the motorcycle is below a predetermined threshold. For example, if the acceleration indicates zero speed, the processor 134 can determine the motorcycle 102 is in a stopped state (e.g., stationary state). As another example, if the acceleration indicates the motorcycle 102 is slowing down and or the speed meets or is less than a predetermined threshold, the processor 134 can determine the motorcycle 102 is in a slowdown state or a slow state. If the determination at block 304 is YES, the method 300 proceeds to block 306. Otherwise, if the determination at block 304 is NO, the method 300 can continue to monitor for a moving state by returning to the start of method 300.

At block 306, the method 300 includes receiving a series of image frames from the image capture device 110. As discussed above, the series of images frames capture a scene in a rearward direction (i.e., rearward direction of the motorcycle 102). Further, as also discussed above, in some embodiments the series of image frames can be received from the image capture device 158 and/or the portable device 109. In some embodiments, the processor 134 and/or the image capture device 110 captures a time (e.g., time of image capture) at which each image frame in the series of image frames is captured and timestamps each image frame with the corresponding time.

At block 308, the method 300 includes receiving spatial position data about the helmet 108 from an inertial measurement unit integrated with the helmet 108. For example, the processor 134 can receive the spatial position data about the helmet 108 from the position determination unit 144. The spatial position data includes at least one of a roll angle, a yaw angle, and a pitch angle of the helmet 108. In some embodiments, the processor 134 and/or the position determination unit 144 captures a time (e.g., time of spatial position capture) at which the spatial position data is captured and the spatial position data can be timestamped with the time. Thus, in some embodiments, during adjustment of the series of image frames (at block 310), the processor 134 can determine how much to rotate and/or translate the series of image frames by corresponding the time the image frame was captured to the time the spatial position data was captured.

At block 310, the method 300 includes adjusting an orientation of the series of image frames based on the spatial position data. In some embodiments, adjusting the orientation of the series of image frames includes adjusting and/or calibrating one or more image processing control parameters (e.g., digital effects) of the image capture device 110 in real time, so that actual physical manipulation of the image capture device 110 is not necessary. By performing this image adjustment, the orientation of each image frame in the series of image frames is level with an orientation of the scene. Each image frame in the series of images must be level with the orientation of the scene (i.e., level with the ground plane 104) so that target vehicles for collision detection can be properly identified and analyzed. For example, during image processing and object recognition, target vehicles can be identified in images based on object recognition training data (e.g., stored at the memory 136 and/or the disk 138). The training data is based on images with backgrounds that are in a level position with the ground plane. Accordingly, in order to identify vehicles accurately, the orientation of each image in the series of image frames is adjusted so that the orientation of each image in the series of image frames is level with the ground plane 104.

In one embodiment, adjusting an orientation of the series of image frames based on the spatial position data includes adjusting an image plane of each image frame in the series of image frames based on the spatial position data. In some embodiments, a horizontal image plane and/or a vertical image plane can be adjusted based on the spatial position data. For example, in one embodiment, the horizontal image plane of each image frame in the series of image frames is adjusted based on the roll angle of a helmet 108, so that the adjusted image frame (e.g., desired image frame) has a horizontal image plane parallel to the ground plane 104. Referring again to FIG. 2A, the image frame 208 has a 2D image plane, namely, a horizontal image plane 212 and a vertical image plane 214. In some embodiments, the horizontal image plane 212 is referred to as an image horizon. In FIG. 2A, the image frame 208 is offset with respect to the ground plane 104 of the scene 202. This is a result of the image capture device 110 not being directed in a line perpendicular to the direction of gravity 122 and/or not parallel to the ground plane 104. As an illustrative example, if the motorcycle operator 106 rotates (roll) his head to the left along the x-axis of the helmet axis 128, the image frame 208 and image capture area 210 are offset so the captured image is tilted by angle Θ as shown in FIG. 2A.

Accordingly, in one embodiment, the processor 134 adjusts (e.g., rotates) the horizontal image plane 212 based on the roll angle (e.g., angle Θ) received from the position determination unit 144. Thus, the processor 134 rotates the image frame 208 so that the image horizon 212 is level (e.g., parallel) with the scene (e.g., the ground plane 104). This is shown in FIG. 2B, where the image frame 208' has an orientation level with the orientation of the scene 202. Here, the horizontal image plane 212 is level with the ground plane 104.

Figure 4A:
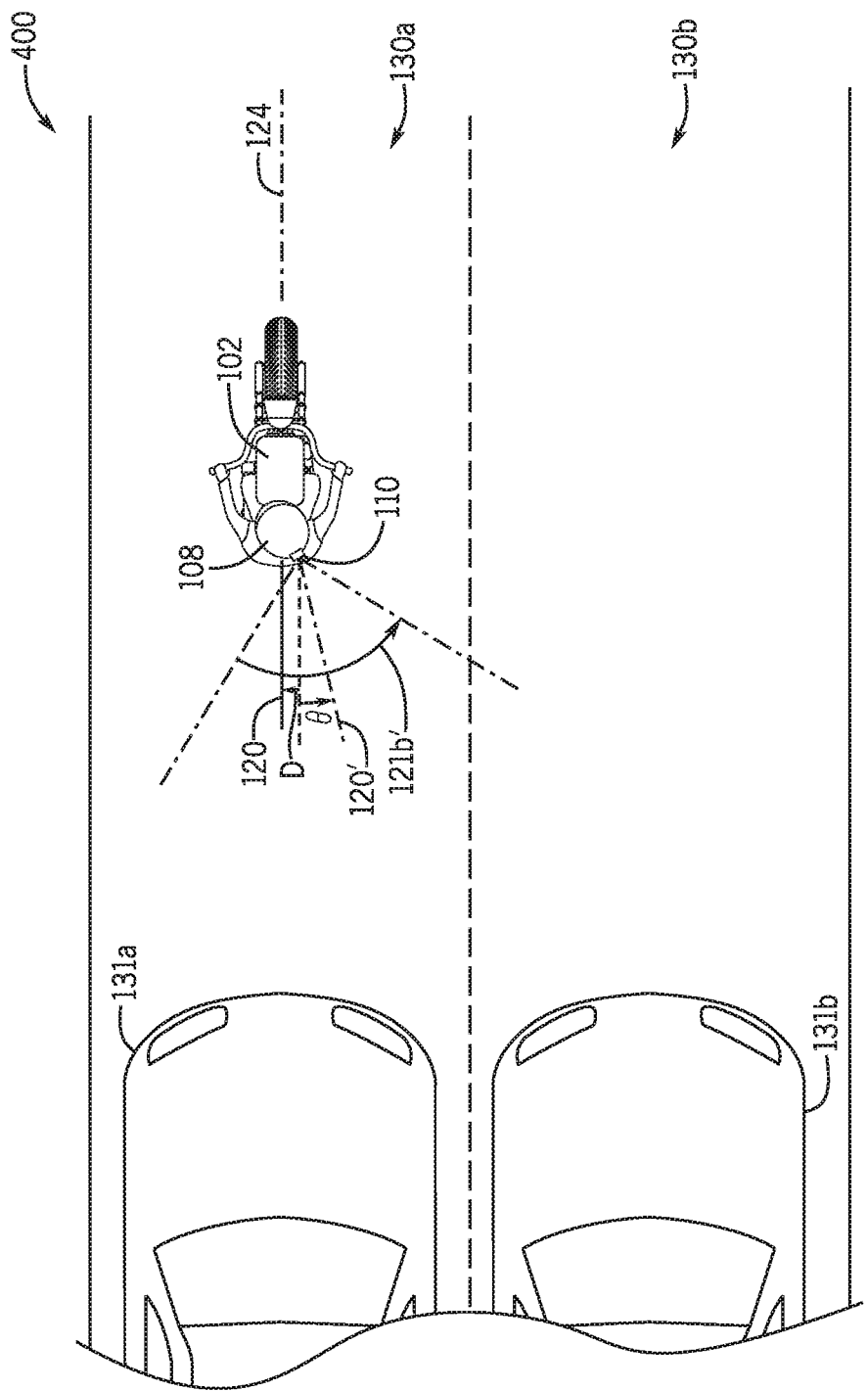
FIG. 4A is top elevation view of the motorcycle as shown in FIG. 1B, but with the helmet turned in a left direction of the motorcycle according to an exemplary embodiment.

In addition to correcting the series of image frames based on roll of the helmet 108, the field of view and translation along the horizontal image plane and/or vertical image plane can be adjusted. Referring now to FIG. 4A, a top view 400 of the motorcycle 102 of FIG. 1B is shown, but in FIG. 4A, the helmet 108 is turned in a left direction of the motorcycle operator 106 by a yaw angle Θ away from the optical axis 120. Accordingly, the optical axis 120 has shifted to an optical axis 120' by a distance D. The optical axis 120' defines a horizontal field of view (HFOV) 121b', which is shifted from the HFOV 121b of FIG. 1B by yaw angle Θ. This results in the image capture device 110 capturing a series of image frames shifted by distance D and yaw angle Θ, which is illustratively shown in FIG. 4B.

Figure 4C:
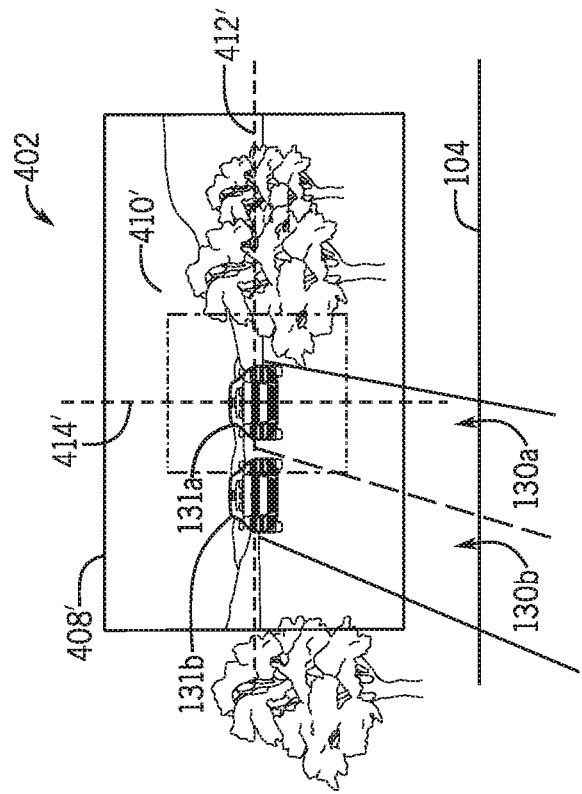
FIG. 4C is the image frame of FIG. 4B adjusted to compensate for the position of the image capture and the helmet according to an exemplary embodiment.
Figure 4B:
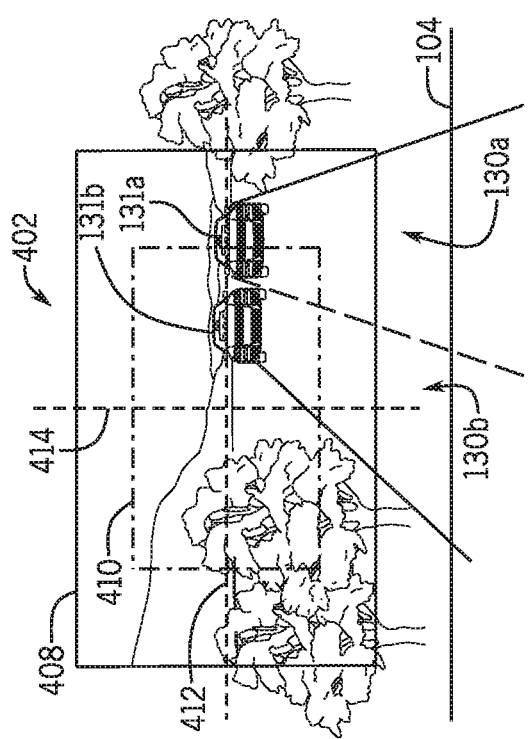
FIG. 4B is an image frame of a scene as viewed through the image capture device on the helmet turned in a left direction as shown in FIG. 4A according to an exemplary embodiment.

FIG. 4B represents a scene 402 including the surrounding environment in a rearward direction of the motorcycle 102 of FIGS. 1A and 1B. Here, the image capture device 110 captures an image frame 408 and an image capture area 410 when the helmet 108 is turned to the left as shown in FIG. 4A. Accordingly, the image frame 408 and the image capture area 410 are shifted and the second target vehicle 131b is positioned in the image frame 408 and the capture area 410 as appearing to be directly behind the motorcycle 102. To compensate for the shift of the image capture device 110 by the yaw angle Θ and the distance D, the processor 134 can adjust the image frame 408 by translating the image frame 408 along the horizontal image plane 412 by the distance D resulting in the image frame 408' and the captured image area 410'.

Additionally, adjusting an orientation of the series of image frames based on the spatial position data includes adjusting the HFOV of the series of image frames based on the yaw angle of the helmet 108. In order to compensate for the motorcycle operator 106 turning his head to the left or right, the HFOV must be greater than a total angle of the +/− yaw angle from straight ahead (e.g., the optical axis 120) that the motorcycle operator 106 can turn his head left or right. As an illustrative example, the motorcycle operator 106 can turn his head 45 degrees to the right (+45) or 45 degrees to the left (−45) from 0 (e.g., from the optical axis 120). Accordingly, in this example, the HFOV 121b shown in FIG. 1B of the image capture device 110 is set to the total angle of at least 90 degrees to accommodate 45 degree turns in either direction. Because of the large HFOV to accommodate the +/− yaw angle, the image frames captured require more processing power and it can be more difficult to identify target vehicles travelling in the same lane as the motorcycle 102 since such a wide viewing angle can include vehicles in other lanes.

Accordingly, by capturing only a portion of the total HFOV as an image capture area, image processing speeds are improved and there is desirable capture resolution in the scene for more accurate identification of target vehicles travelling behind the motorcycle 102 and in the same lane as the motorcycle 102. Thus, to increase image processing speeds and avoid detection of a target vehicle in the image frame that is not directly behind the motorcycle 102, the processor 134 can define and capture a capture area of the image frame that is smaller than the image frame. For example, as shown in FIG. 4C, the HFOV has been adjusted by the yaw angle Θ defined by the image capture area 410'.

Figure 5A:
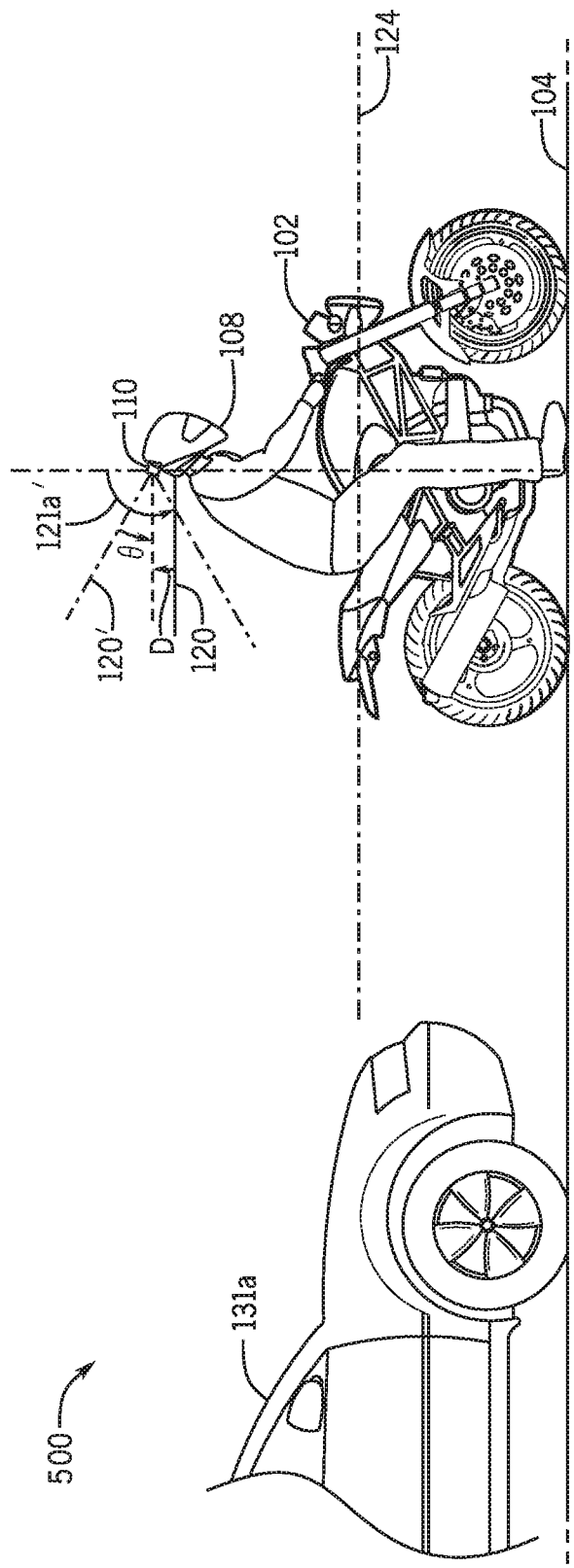
FIG. 5A is side elevation view of the motorcycle as shown in FIG. 1A, but with the helmet pitched in a downward direction according to an exemplary embodiment.

In addition to adjusting translation along the horizontal image plane and adjusting the HFOV, adjusting an orientation of the series of image frames based on the spatial position data can also include adjusting a vertical field of view (VFOV) and/or adjusting a translation along a vertical image plane of the series of image frames based on the pitch angle of the helmet 108. Referring now to FIG. 5A, a side view 500 of the motorcycle 102 of FIG. 1A is shown, but in FIG. 5A, the helmet 108 is tilted in a downward direction by a pitch angle Θ and a distance D away from the optical axis 120, which is due to the posture of the motorcycle operator 106 in FIG. 5A of leaning towards the front of the motorcycle 102 and tilting his head downward. Accordingly, the optical axis 120 has shifted to an optical axis 120' by a distance D. The optical axis 120' defines a VFOV 121a', which is shifted from the VFOV 121a of FIG. 1A by a pitch angle Θ. This results in the image capture device 110 capturing a series of image frames shifted by distance D and a pitch angle Θ, which is shown in FIG. 5B.

FIG. 5B represents a scene 502 including the surrounding environment of the motorcycle 102 in a rearward direction in FIGS. 1A and 1B. Here, the image capture device 110 captures an image frame 508 and an image capture area 510 when the helmet 108 pitched in a downward direction as shown in FIG. 5A. Accordingly, the image frame 508 and the image capture area 510 are shifted and the target vehicle 131a and the second target vehicle 131b are positioned in a lower portion of the image frame 508 and the capture area 510. To compensate for the shift of the image capture device 110 by the pitch angle Θ and the distance D, the processor 134 can adjust the image frame 508 by translating the image frame 508 along the vertical image plane 512 by the distance D resulting in the image frame 508' and the captured image area 510'.

Additionally, adjusting an orientation of the series of image frames based on the spatial position data includes adjusting the VFOV of the series of image frames based on the pitch angle of the helmet 108. In order to compensate for the motorcycle operator 106 tilting his head up or down, the VFOV must be greater than a total angle of the +/− pitch angle. As an illustrative example, the motorcycle operator 106 can tilt his head up 15 degrees (+15) or tilt his head down 45 degrees (−15) from 0. Accordingly, in this example, the VFOV 121a shown in FIG. 1A of the image capture device 110 is set to the total angle of at least 30 degrees to accommodate 15 degree tilt in either direction. Because of the large VFOV to accommodate the +/− pitch angle, image frames captured require more processing power and it can be more difficult to identify target vehicles travelling in the same lane as the motorcycle 102. Thus, by capturing only a portion of the total VFOV as an image capture area, image processing speeds are improved and there is desirable capture resolution in the scene for more accurate identification of target vehicles travelling behind the motorcycle 102 and in the same lane as the motorcycle 102. In order to increase image processing speeds and avoid detection of a target vehicle in the image frame that is not directly behind the motorcycle 102, the processor 134 can define and capture a capture area of the image frame that is smaller than the image frame. For example, as shown in FIG. 5C, the VFOV has been adjusted by the pitch angle Θ defined by the image capture area 510'.

Figure 6:
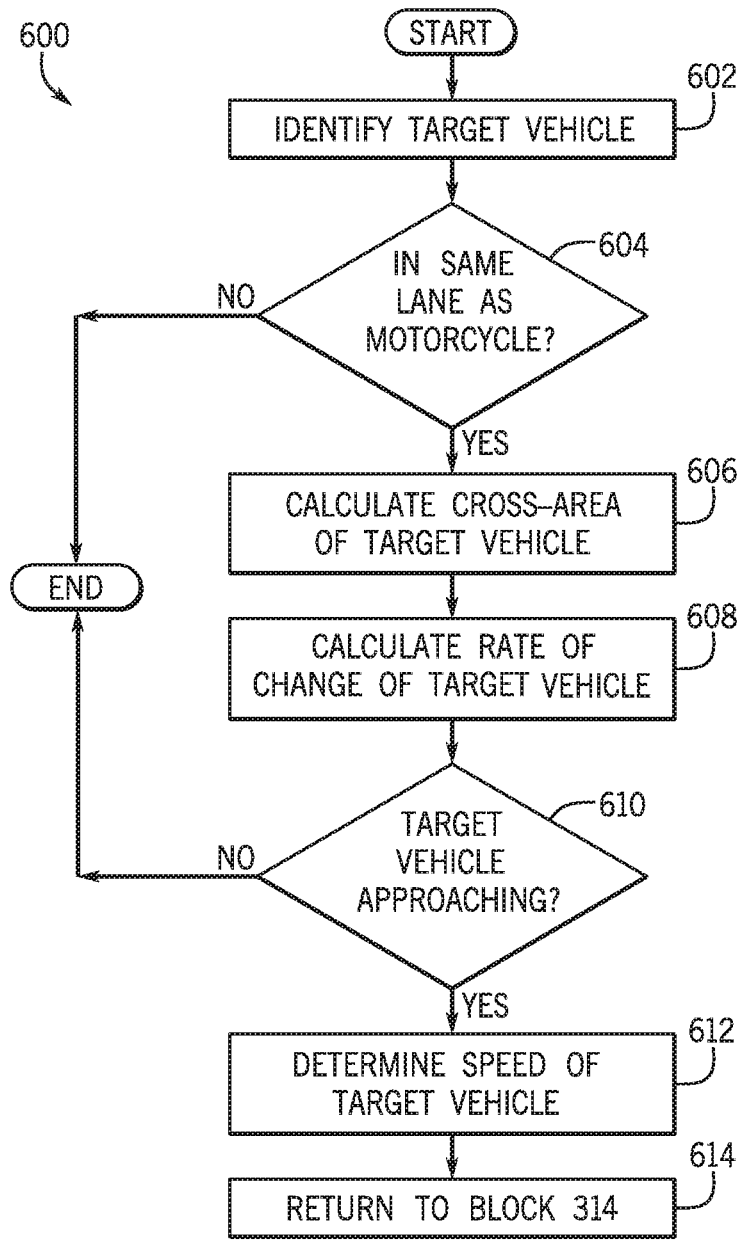
FIG. 6 is a process flow diagram of a method for identifying a target vehicle approaching the motorcycle according to an exemplary embodiment.
Figure 7:
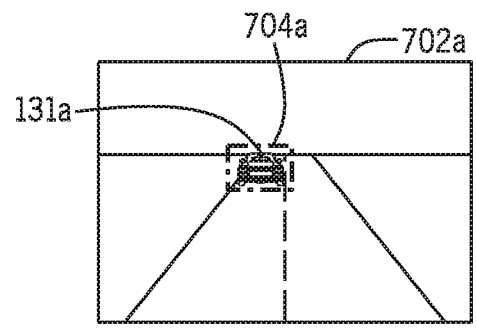
FIG. 7 illustrates a series of image frames for identifying a target vehicle approaching the motorcycle according to an exemplary embodiment.
Figure 7:
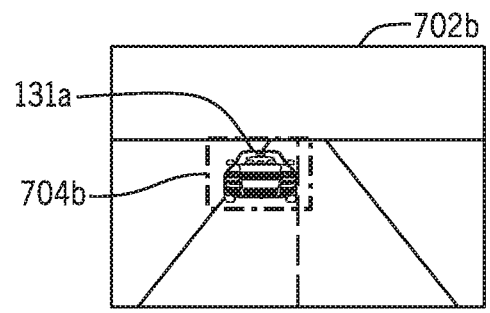
Figure 7:
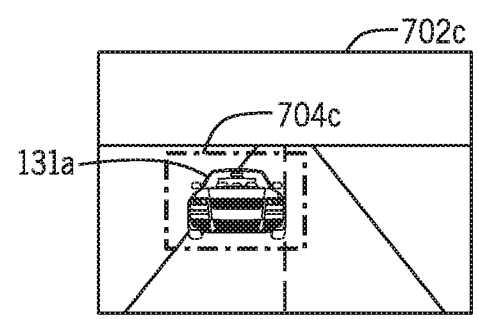
Figure 7:
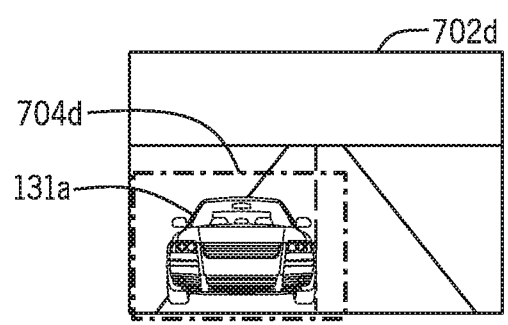

As mentioned above, adjusting the image frames to have proper orientation allows for more accurate identification of approaching vehicles that pose a collision risk to the motorcycle 102. Accordingly, referring again to FIG. 3, at block 312, the method 300 includes determining an approach of a target vehicle based on the series of image frames. Said differently, block 312 can include determining whether the target vehicle 131a is approaching from a rearward direction of the motorcycle 102 in the same lane as the motorcycle 102. Thus, by using image processing on the adjusted series of image frames (e.g., as adjusted at block 310), the relative speed, velocity, and acceleration between the target vehicle 131a and the motorcycle 102 can be measured. Block 312 will now be described in more detail with the method 600 of FIG. 6 and the illustrative example shown in FIG. 7. At block 602, the method 600 includes identifying a target vehicle in the series of image frames. FIG. 7 illustrates a series of images frames including a first image frame 702a, a second image frame 702b, a third image frame 702c, and a fourth image frame 702d. The images frames in FIG. 7 represent image frames captured by the image capture device 110 of FIGS. 1A, 1B, and 1C, but for simplicity, only the target vehicle 131a is shown. In this embodiment, each image in the series of image frames is captured sequentially by the image capture device 110. The processor 134 can use object recognition techniques to identify the target vehicle 131a in each image frame in the series of images frames, using for example, matching, learning, or pattern recognition algorithms, appearance-based or feature-based techniques, among others.

As shown in FIG. 7, the processor 134 determines and defines a bounding box around a region of interest in the image frame identifying the target vehicle 131a. For example, a bounding box 704a is defined in the first image frame 702a. After the detection of the target vehicle 131a first occurs in the first image frame 702a, a certain area of the next image, the second image frame 702b, is already preselected by a bounding box and is used to define the bounding box 704b in the second image frame 702b, and so on. Thus in one embodiment, identifying the target vehicle 131a in the series of image frames includes tracking the position (e.g., bounding box) of the target vehicle 203 in each image frame in the series of image frames.

At block 604, the method 600 includes determining if the target vehicle 131a identified at block 602 is in the same lane as the motorcycle 102. In one embodiment, the processor 134 determines if the target vehicle 131a is in the same lane as the motorcycle 102 based on the yaw angle received from the position determination unit 144. If the yaw angle is within a predetermined threshold (e.g., +/−5 degrees) from straight ahead, then any target vehicle identified in the image frame is determined to be in the same lane as the motorcycle 102. If the determinations is YES, the method 600 proceeds to block 606. If the determination at block 604 is NO, the method 600 ends.

At block 606, the method 600 includes, calculating a cross-area of the target vehicle for each image frame in the series of image frames. More specifically, a frontal cross-area of the target vehicle 131a is calculated as the bounding box. Said differently, the area of the bounding box defined in each image frame in the series of image frames is calculated. For example, in FIG. 7, the bounding box 704a has an area of 100 pixels, the bounding box 704b has an area of 200 pixels, the bounding box 704c has an area of 300 pixels, and the bounding box 704d has an area of 400 pixels. As will be discussed with block 610, if the area is increasing in each image frame, the processor 134 determines that the target vehicle 131a is approaching the motorcycle 102.

At block 608, the method 600 includes calculating the rate of change of the position of the target vehicle based on the cross-area of the target vehicle for each image frame in the series of image frames. The rate of change (i.e., increase) in the cross-area of the target vehicle 131a in the series of image frames can be used to determine a speed of the target vehicle 131a towards the motorcycle 102 at block 610. The rate of change calculation is relative to the first (i.e., initial) cross-area detected in the first image frame (i.e., the first image frame 702). As an illustrative example with respect to FIG. 7, if the image capture device 110 processes at 10 frames-per-second (fps), the bounding box 704a of the first image frame 702a has an area of 100 pixels, and the bounding box 704d of the fourth image frame 702d has an area of 400 pixels, then the area of the target vehicle 131a increased from 100 pixels to 400 pixels in three (3) frames at 0.3 seconds. Thus, the rate of change is 1000 pixels per second. Accordingly, at block 610, it is determined if the target vehicle 131a is approaching the motorcycle 102. For example, if the area is increasing in each image frame as shown in FIG. 7, the processor 134 determines that the target vehicle 131a is approaching the motorcycle 102. If the determination at block 610 is YES, the method 600 proceeds to block 612. Otherwise, the method 600 ends.

Using the rate of change, at block 612, the method 600 includes the processor 134 determining a speed of the target vehicle 131a that corresponds to the calculated rate of change. For example, the processor 134 can access a look-up table in the memory 136 and/or the disk 138 and determine vehicle speeds that correspond to the rate of change. At block 614, the method 600 then returns to block 314 of the method 300. Referring again to FIG. 3, at block 314 the method 300 includes determining if a collision is likely with the motorcycle 102 and the identified target vehicle 131a. In some embodiments, the processor 134 determines a probability of a collision based on the rate of change and the speed of the target vehicle 131a. For example, if the rate of change meets or exceeds a predetermined threshold, the processor 134 can determine a probability of a collision and/or if a rear-end collision is likely.

It is understood that other types of statistical and probabilistic methods for determining likelihood of a collision can be implemented at block 314. Further, it is understood that in some embodiments, motorcycle operating data from the vehicle systems and sensors 156 can be used to determine a likelihood of a collision. For example, the processor 134 can receive a distance and/or a time headway between the motorcycle 102 and the target vehicle 131a and/or time to collision data from the vehicle systems and sensors 156. This additional information can be used to determine if a collision is likely. For example, the processor 134 can determine a collision is likely if the speed of the target vehicle 131a meets or exceeds a predetermined threshold, and the distance between the motorcycle 102 and the target vehicle 131a is less than a predetermined threshold.

If the determination at block 314 is YES, the method 300 proceeds to block 316. At block 316, the method 300 includes controlling an output device and/or the motorcycle 102. For example, the processor 134 can control an output device (e.g., the HMI 140 and/or the display 142) coupled to the helmet 108 to generate a collision warning. In particular, the processor 134 can generate a control signal to control an output device coupled to the helmet 108 to output a warning based on the speed of the target vehicle 131a and the rate of change of the position of the target vehicle 131a. As an illustrative example, the processor 134 can control the HMI 140 to generate visual warnings on the display 142 related to the target vehicle 131a. The HMI 140 could also provide auditory and/or haptic alerts related to the target vehicle 131a.

In another embodiment, the processor 134 can control the motorcycle 102 and/or communicate information to the motorcycle 102 to control the HMI 160 and/or the display 162. For example, the processor 134 can generate visual warnings on the display 162 (e.g., windshield of the motorcycle 102) related to the target vehicle 131a. The HMI 160 could also provide auditory and/or haptic alerts related to the target vehicle 131a. For example, tactile feedback via the handles, seat and/or pedals of the motorcycle 102 can be controlled to provide a collision warning and/or provide information about the target vehicle 131a to the motorcycle operator 106. In a further embodiment, the processor 134 can control the motorcycle 102, and/or communicate information to the portable device 109 to provide visual, auditory, and/or haptic alerts related to the target vehicle 131a. For example, in some embodiments, the portable device 109 includes a display (not shown), and the processor 134 can generate visual warnings on the display.

The motorcycle 102, including one or more of the vehicle systems and sensors 156 can be controlled in response to determining a collision is likely. For example, semi-autonomous and/or autonomous control of the motorcycle 102 can be implemented by controlling the motion and/or path of the motorcycle 102. Thus, specific motion commands for motor, steering, and other vehicle systems and sensors 156 can be implemented. In some embodiments, the processor 134 and/or the processor 150 can directly control the motorcycle 102. In some embodiments, the processor 134 can communicate collision information (e.g., rate of change, speed of target vehicle 131a) to the motorcycle 102, and the processor 150 can then in turn control one or more of the vehicle systems and sensors 156.

As an illustrative example, the processor 134 and/or the processor 150 can control the motorcycle 102 to automatically move forward slowly to decrease the likelihood of the collision with the target vehicle 131a. If the vehicle is in a stopped state (e.g., block 304), the processor 134 and/or the processor 150 can control the motorcycle 102 to automatically release the brakes. In another example, the processor 134 and/or the processor 150 can automatically change the path or direction of motion of the motorcycle, for example, by implementing a lane change, a swerve maneuver, or maneuvering the motorcycle 102 to the side of the road to decrease the likelihood of the collision with the target vehicle 131a. Further, in some embodiments, the processor 143 and/or the processor 150 can communicate information (e.g., an alert, notification, warning) to the target vehicle 131a and/or the second target vehicle 131b, using for example, a vehicle communication network, a cellular network (e.g., via the portable device 109), a vehicle-to-vehicle network, a vehicle-to-infrastructure network, and/or a vehicle-to-everything network. It is understood that any other type of warning, notification, alert, and/or vehicle system control can be implemented based on the determination of a likelihood of a rear-end collision.

It is understood that the embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

Further, it will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed herein.

The invention claimed is:

1. A computer-implemented method for providing a collision warning using an image capture device mounted on a rear portion of a helmet, the method comprising:

receiving a series of image frames from the image capture device, wherein the series of images capture a scene in a rearward direction;

receiving spatial position data about the helmet from an inertial measurement unit integrated with the helmet, wherein the spatial position data includes at least one of a roll angle, a yaw angle, and a pitch angle of the helmet;

adjusting an orientation of the series of image frames based on the spatial position data so that the orientation of the series of image frames is level with an orientation of the scene;

identifying a target vehicle in each image frame of the series of image frames using object recognition;

calculating a cross-area of the target vehicle in each image frame of the series of image frames;
calculating a rate of change of a position of the target vehicle based on the cross-area of the target vehicle in each image frame of the series of image frames;
calculating a speed of the target vehicle based on the rate of change of the position of the target vehicle; and
controlling an output device coupled to the helmet to generate the collision warning based on the speed of the target vehicle and the rate of change of the position of the target vehicle.

2. The computer-implemented method of claim 1, wherein the helmet is communicatively coupled to a motorcycle and further including determining the motorcycle is in a stopped state.

3. The computer-implemented method of claim 1, further including adjusting a horizontal field of view of the series of image frames based on the yaw angle of the helmet and adjusting a capture area of each image frame in the series of image frames to be smaller than the horizontal field of view.

4. The computer-implemented method of claim 1, further including adjusting a vertical field of view of the series of image frames based on the pitch angle of the helmet.

5. The computer-implemented method of claim 1, wherein identifying the target vehicle in the series of image frames includes tracking the position of the target vehicle in the series of image frames.

6. The computer-implemented method of claim 1, wherein calculating the speed of the target vehicle is based on a look-up table and the rate of change of the position of the target vehicle in the series of image frames.

7. The computer-implemented method of claim 1, further including determining a risk of collision based on the speed of the target vehicle and the rate of change of the position of the target vehicle.

8. A helmet for a motorcycle being ridden by a driver wearing the helmet, comprising:
an image capture device mounted to a rear portion of the helmet, wherein the image capture device captures a series of image frames of a scene in reward direction of the motorcycle;
an inertial measurement unit;
an output device;
a processor operably connected for computer communication to the image capture device, the inertial measurement unit, and the output device wherein the processor:
receives spatial position data about the helmet relative to a reference orientation from the inertial measurement unit, wherein the spatial position data includes at least one of roll angle, a yaw angle, and a pitch angle of the helmet;
adjusts an orientation of the series of image frames based on the spatial position data so that the orientation of the series of image frames is level with the reference orientation;
identifies a target vehicle in each image frame of the series of image frames using object recognition;
calculates a cross-area of the target vehicle in each image frame of the series of image frames;
calculates a rate of change of the target vehicle based on the cross-area of the target vehicle in each image frame of the series of image frames; and
upon determining the target vehicle is approaching the motorcycle using the rate of change, controlling the output device to generate a warning.

9. The helmet of claim 8, wherein the helmet is communicatively coupled to the motorcycle and further including determining the motorcycle is in a stopped state based on motorcycle operating information received from the motorcycle.

10. The helmet of claim 8, further including the processor adjusting a horizontal field of view and a vertical field of view of the series of image frames based on the spatial position data.

11. The helmet of claim 8, where the processor determines the target vehicle is approaching the motorcycle based on an increase in the rate of change in the series of image frames.

12. The helmet of claim 8, further including the processor determining a speed of the target vehicle based on the rate of change.

13. The helmet of claim 8, wherein the processor calculates the rate of change relative to a first cross-area calculated in a first image frame of the series of image frames and a last cross-area calculated in a last image frame of the series of image frames.

14. A non-transitory computer-readable storage medium including instructions that when executed by a processor, causes the processor to:
receive a series of image frames from an image capture device mounted to a rear portion of a helmet, wherein the series of images capture a scene in a rearward direction;
receive spatial position data about the helmet from an inertial measurement unit integrated with the helmet, wherein the spatial position data includes at least one of a roll angle, a yaw angle, and a pitch angle of the helmet;
adjust an orientation of the series of image frames based on the spatial position data so that the orientation of the series of image frames is level with an orientation of the scene;
detect a target vehicle in each image frame of the series of image frames using object recognition;
calculate a cross-area of the target vehicle in each image frame of the series of image frames;
calculate a rate of change of a position of the target vehicle based on the cross-area of the target vehicle in each image frame of the series of image frames;
calculate a speed of the target vehicle based on the rate of change of a position of the target vehicle; and
generate a control signal to control an output device coupled to the helmet to output a warning based on the speed of the target vehicle and the rate of change of the position of the target vehicle.

15. The non-transitory computer-readable storage medium of claim 14 further causes the processor adjust a horizontal field of view and a vertical field of view of the series of image frames based on the spatial position data.

16. The non-transitory computer-readable storage medium of claim 14, further causes the processor to generate the control signal upon determining the rate of change meets a predetermined threshold thereby indicating a risk of collision with the target vehicle.

17. The non-transitory computer-readable storage medium of claim 14, wherein the speed of the target vehicle is based on a look-up table and the rate of change of the position of the target vehicle in the series of image frames.

* * * * *